Nov. 21, 1939.  D. F. WARNER  2,181,002
ELASTIC FLUID TURBINE PLANT
Filed Feb. 19, 1938

Inventor:
Donald F. Warner,
by Harry E. Dunham
His Attorney.

Patented Nov. 21, 1939

2,181,002

UNITED STATES PATENT OFFICE 2,181,002

ELASTIC FLUID TURBINE PLANT

Donald F. Warner, Swampscott, Mass., assignor to General Electric Company, a corporation of New York Application February 19, 1938, Serial No. 191,524

2 Claims. (Cl. 285—25)

The present invention relates to elastic fluid turbine plants, more particularly to arrangements for supplying oil or like inflammable substance under pressure to hydraulic motors, bearings or other elements forming part of or associated with elastic fluid turbines. The supply of oil under pressure from a source such as a tank to elements requiring oil under pressure constitutes a fire hazard in modern turbine plants because with the high temperature elastic fluids to which modern turbines are subjected their outer surfaces reach temperatures high enough instantaneously to ignite oil or other inflammable substance coming in contact therewith. It therefore becomes important in such plants to provide special means for reducing fire hazard due to oil leakage in the supply pipes located in proximity to the turbines, that is, at such distances from highly heated turbine parts that an oil jet occurring as the result of a leak in the oil supply conduit might reach such highly heated turbine part and become ignited were it not for the provision of such special protecting means.

The object of my invention is to provide an improved construction and arrangement of elastic fluid power plants whereby the danger of fire hazard due to oil leakage from the oil supply conduits is considerably reduced.

For a consideration of what I believe to be novel and my invention, attention is directed to the following description and the claims appended thereto in connection with the accompanying drawing.

Figure 1:
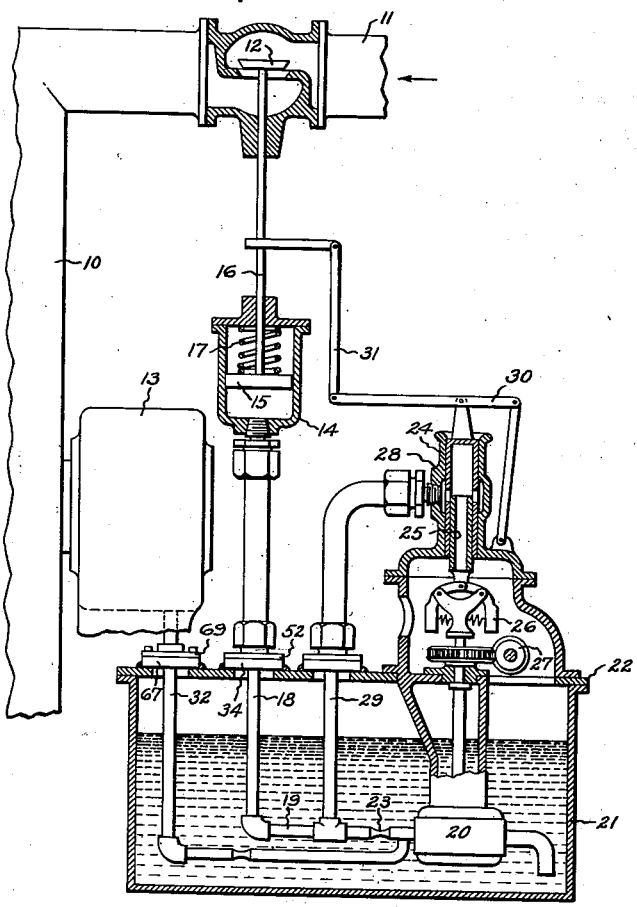
Figure 2:
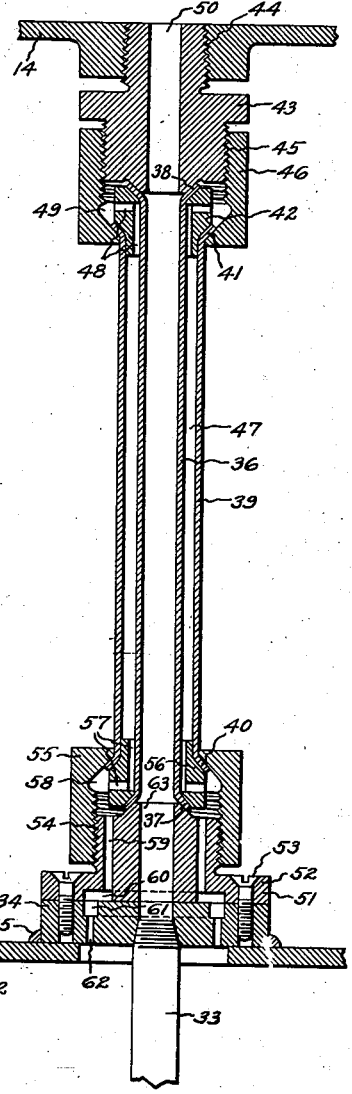
Figure 3:
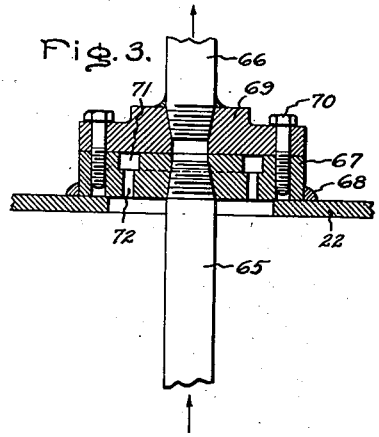

In the drawing, Fig. 1 represents an elastic fluid turbine plant embodying my invention, and Figs. 2 and 3 represent enlarged views of details of Fig. 1.

The arrangement comprises an elastic fluid turbine 10 having an inlet conduit 11 with a control valve 12 for controlling the flow of elastic fluid to the turbine and a bearing 13 for supporting the turbine shaft. The mechanism for controlling the valve 12 includes a hydraulic motor 14 with a piston 15 having a stem 16 connected to the valve 12 and biased in downward direction by a compression spring 17. Fluid under pressure, preferably oil, is supplied to the motor 14 by the conduits 18, 19 connected to the discharge of a pump 20 located in a tank 21 with a cover 22 and in the present instance driven from the turbine shaft. The conduit 19 has a restriction 23. The pressure in the conduit 18 and consequently in the hydraulic motor 14 is controlled by means of a pilot valve 24 having a sleeve 25 connected to a centrifugal type speed governor 26, which latter is driven from the turbine shaft through the intermediary of a gearing 27. The pilot valve has an outer casing 28 connected by a conduit 29 to the conduit 19 behind the restriction 23 as regards the direction of flow through the conduit 19. The pilot valve also has a bushing intermediate the casing 28 and the sleeve 25 and pivotally connected to a follow-up lever 30 which is fulcrumed at its right-hand end, and at its left-hand end is connected by a link 31 to the piston stem 16. The oil discharged from the pump 20 flows through the conduit 29 and variable port openings formed by the pilot valve bushing and sleeve, whence the oil is returned to the tank. The oil pressure in the conduit 19 accordingly depends upon the restriction to the flow of fluid through said ports. Thus, if the turbine speed increases, causing outward movement of the flyweights of the governor 26, the latter moves the sleeve 25 downward whereby the restriction to flow of oil from the conduit 29 through the pilot valve is reduced, resulting in a drop in pressure in the conduit 18 and accordingly downward movement of the piston 15 in the hydraulic motor 14, thus moving the valve 12 towards closing position. Similarly, a drop in speed causes operation of the speed-governing mechanism to open the control valve 12. Any movement of the hydraulic motor restores through the follow-up lever 30 the pilot valve bushing to its original relative position with respect to the sleeve 25. A governing mechanism of this general type is more fully described in my Patent No. 1,669,108 which is assigned to the same assignee as the present application.

The arrangement shown in the drawing also includes a pipe 32 for conducting oil under pressure to the bearing 13 in order to lubricate and cool the latter. In the present example, the pipe 32 also receives oil under pressure from the discharge of the pump 20. The pipes 18, 29 and 32 have portions located inside the tank 21 and other portions located outside the tank and in proximity to the heated turbine casing. In accordance with my invention I provide means to prevent leakage fluid from these pipes from coming in contact with the heated turbine casing. The various conduits 18, 29, 32 have sections flanged together. Leakage of fluid under pressure conducted through these conduits may take place through the joints formed by the flanges or through breaks in the conduits. In the present arrangement I have shown means for protecting the turbine against leakage from the flanges formed between joining sections of the conduits 18, 29 and 32, and other means for protecting the turbine against leakage due to breakage of the conduits 18 and 29. Fig. 2 shows a detail view of the protecting means with regard to conduit 18, and Fig. 3 shows a detail view of the protecting means of a flange formed by the conduit 32. The conduit 18 which serves to conduct oil under pressure to the hydraulic motor 14 has a section 33 located inside the tank 21 and screwed into a flange 34, which latter is united with the tank cover 22 by fused metal 35. The conduit section 33 is connected to the hydraulic motor 14 by means including a tube 36 with flared end portions 37 and 38. The tube 36 is concentrically surrounded by another tube 39 with similarly flared end portions 40 and 41. The upper flared tube portions 38 and 41 are held in spaced relation by a spacer 42 with conically shaped surfaces engaging corresponding surfaces of the flared tube portions. The upper tube portions are secured to the casing of the hydraulic motor 14 by a connecting member 43 which has a threaded portion 44 screwed into an opening in the casing of the hydraulic motor and preferably brazed thereto. The connecting member 43 has another threaded portion 45 to which the flared portions with the spacer 42 are secured by means of a nut 46. The portion 45 and the nut 46 have conically shaped surfaces engaging the corresponding surfaces of the flared portions 38 and 41 respectively. The tubes 36 and 39 form an annular space 47 which communicates through bores 48 in the spacer 42 with an annular space 49 formed between the nut 46 and the elements connected thereto. The connecting member 43 has a bore 50 which forms an extension of the bore of the tube 36 for conducting fluid forced through the tube 36 into the hydraulic motor 14. Any fluid under pressure leaking through a break in the tube 36 into the space 47 is returned to the tank 21, as will be more fully described hereinafter. Any leakage through the joining surfaces between the connecting member 43 and the flared portion 38 is conducted through the annular channel 49 and the bores 48 to the space 47 whence it is returned to the tank or source of supply 21.

The aforementioned section 33 inside the tank 21 is connected to the tube 36 by means of a connecting member 51 which has a flange 52 fastened to the flange 34 by a plurality of screws 53 and a threaded extension 54 secured to the flared portions 37 and 40 by means of a nut 55 similar to the nut 46 and a spacer 56 similar to the spacer 42. The spacer has bores 57 to establish communication between the space 47 and an annular channel 58 defined by the nut 55. The channel 58 communicates with the tank through vertical bores 59 in the threaded extension 54, annular grooves 60 and 61 in the flanges 52 and 34 respectively and vertical channels or bores 62 in the flange 34. Any leakage through a break in the conduit 36 or through the joining surfaces between the flared portion 37 and the threaded extension 54 is returned through the channels and bores 58, 59, 60, 61 and 62 to the tank 21.

The threaded extension 54 has a bore 63 which forms a part of the conduit 18. The grooves 60, 61 in the flanges 52 and 34 respectively are also important as a sealing means for these flanges in that they prevent leakage fluid along the joining surfaces between the flanges from radially passing past the grooves 60, 61. Any fluid under pressure leaking radially between the joining surfaces of the flanges 34 and 52 is returned to the tank 22 through the groove 61 and the vertical bores 62. The groove 61, from another viewpoint, establishes atmospheric pressure, that is the pressure inside the tank along an intermediate, annular portion of the joining surfaces of the flanges 34 and 52 and thereby prevents leakage fluid from passing radially past said grooves.

The conduit 32, as shown in Fig. 3, has a section 65 inside the tank 21 and another section 66 outside thereof. The section 65 is screwed into a flange 67 secured to the tank by a weld 68, and the section 66 is screwed into a flange 69 which is fastened to the flange 67 by a plurality of bolts 70 and corresponding to the elements 34, 52, 55 of Fig. 2. The face of the flange 67 adjacent the flange 69 has a groove 71 communicating with the tank 21 through a plurality of channels or bores 72. The groove 71 with the channels 72 establishes atmospheric pressure along an annular portion of the joining surfaces or faces of the flanges 67 and 69 and thereby acts as a seal, preventing fluid leaking radially along the joining flange surfaces from passing beyond the groove 71, any leakage fluid being returned through the groove 71 and the channels 72.

By my invention I have accomplished an improved elastic fluid turbine arrangement in which fire hazard due to leakage of oil from an oil supply system is considerably reduced. The pressure conduits, that is, the conduits subject to high pressure of the oil supply system in accordance with my arrangement include tubular elements concentrically spaced with and surrounding the pressure pipe to form channels for returning leakage oil to the source of supply, such as the oil tank. These tubular members, which may be called drip conduits, are secured by special connecting means to the source and the element to which oil under pressure is to be conducted.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. In a system for conveying fluid under pressure the combination of a tank having a flanged opening, a tube with a flared end portion, and means connecting the flanged end portion to the opening and for returning leakage from the tube to the tank, said means comprising a connecting element having a flange secured to the flanged opening and a screw-threaded extension with a conical surface engaging the flared end portion, another tube with a flared end portion concentrically spaced from the first tube, a spacer with conical surfaces engaging the flared end portions and a nut engaging the flared end portion of the other tube and secured to the screw-threaded extension.

2. In a system for conveying fluid under pressure the combination of a tank having a flanged opening, a tube with a flared end portion, and means connecting the flared end portion to the opening and for returning leakage from the tube to the tank comprising a connecting member having a flange secured to the flanged opening and a screw-threaded extension with a conical surface engaging the flared portion, another tube with a flared end portion concentrically spaced from the first named tube, a spacer with conical surfaces engaging the flared end portions, a nut engaging the flared end portion of the other tube and secured to the screw-threaded extension, one of the engaging flange surfaces forming an annular channel, the screw-threaded extension and the spacer forming channels to establish communication of the space between the tubes with said annular channel, and a drain channel connected to the annular channel.

DONALD F. WARNER.